(12) United States Patent
Al (10) Patent No.: US 9,155,064 B2
(45) Date of Patent: Oct. 6, 2015

(54) METHOD AND DEVICE FOR PROCESSING PAGING MESSAGE WHEN IDLE STATE SIGNALLING REDUCTION IS ACTIVE

(75) Inventor: Ming Al, Beijing (CN)

(73) Assignee: CHINA ACADEMY TELECOMMUNICATIONS TECHNOLOGY, Beijing (CN)

( * ) Notice: Subject to any disclaimer, the term of this patent is extended or adjusted under 35 U.S.C. 154(b) by 126 days.

(21) Appl. No.: 13/578,235

(22) PCT Filed: Jan. 30, 2011

(86) PCT No.: PCT/CN2011/070792
§ 371 (c)(1),
(2), (4) Date: Aug. 30, 2012

(87) PCT Pub. No.: WO2011/098008
PCT Pub. Date: Aug. 18, 2011

(65) Prior Publication Data
US 2012/0315930 A1    Dec. 13, 2012

(30) Foreign Application Priority Data
Feb. 10, 2010   (CN) .......................... 2010 1 0110936

(51) Int. Cl.
*H04W 68/00* (2009.01)
*H04W 68/02* (2009.01)

(52) U.S. Cl.
CPC .............. *H04W 68/00* (2013.01); *H04W 68/02* (2013.01)

(58) Field of Classification Search
CPC ............................... H04W 68/02; H04W 68/00
USPC .................................. 455/458, 466; 370/221
See application file for complete search history.

(56) References Cited

U.S. PATENT DOCUMENTS

| 2002/0061756 A1* | 5/2002 | Bleckert et al. ................ 455/458 |
| 2011/0116449 A1* | 5/2011 | Hu et al. ........................ 370/328 |

FOREIGN PATENT DOCUMENTS

| CN | 1585549 | 2/2005 |
| CN | 101291461 | 10/2008 |

(Continued)

OTHER PUBLICATIONS

3GPP Technical Specification Group Services and System Aspects: 3GPP TS 23.272 V9.2.0 (Dec. 2009).

(Continued)

*Primary Examiner* — Chuck Huynh
(74) *Attorney, Agent, or Firm* — Foley & Lardner LLP (57) ABSTRACT

The present invention discloses a method and device for processing paging message when Idle State Signalling Reduction (ISR) is active. The method includes the following step: a Mobility Management Entity (MME) determines that a Mobile Switching Center (MSC)/Visited Location Register (VLR) is a default MSC/VLR and the paging message is used for a Short Message Service (SMS), the MME does not send the paging message to a Serving General Packet Radio Service (GPRS) Support Node (SGSN). The present invention can reduce the unnecessary paging signalling in an Evolved Packet System (EPS) and the 2nd Generation (2G)/3rd Generation (3G), therefore avoiding the network resource waste occurred in the interface of the MME and the SGSN, in the air interface of a General Packet Radio Service/Enhanced Data Rate for Global System for Mobile communication Evolution Radio Access Network (GERAN)/Universal Terrestrial Radio Access Network (UTRAN), and in the MSC/VLR.

8 Claims, 2 Drawing Sheets

(56) References Cited

FOREIGN PATENT DOCUMENTS

| CN | 101499967 | 8/2009 |
|---|---|---|
| CN | 101640933 | 2/2010 |
| EP | 2249605 | 11/2010 |
| WO | WO-2009/097814 | 8/2009 |

OTHER PUBLICATIONS

International Search Report dated May 5, 2011 issued in PCT/CN2011/070792.

Supplementary European Search Report for European Patent Application No. 11741879.8 mailed Sep. 30, 2013.

Catt: Correction to UE behavior when ISR Activated and SMSoverSGs, 3GPP Draft; S2-100458, 3rd Generation Partnership Project (3GPP), Mobile Competence Centre; 650, Route Des Lucioles; F-06921 Sophia-Antipolis Cedex, France, vol. SA WG2, No. Shenzhen; 20100118, Jan. 12, 2010.

Catt: Issues of ISR and SMSonly Co-existing scenario, 3GPP Draft; S2-101407, 3rd Generation Partnership Project (3GPP), Mobile Competence Centre; 650, Route Des Lucioles; F-06921 Sophia-Antipolis Cedex, France, vol. SA WG2, No. San Francisco, USA; 20100222, Feb. 16, 2010.

* cited by examiner

METHOD AND DEVICE FOR PROCESSING PAGING MESSAGE WHEN IDLE STATE SIGNALLING REDUCTION IS ACTIVE

CROSS-REFERENCE TO RELATED APPLICATIONS

The present application is a US National Stage of International Application No. PCT/CN2011/070792, filed 30 Jan. 2011, designating the United States, and claiming priority to Chinese Patent Application No. 201010110936.1 filed 10 Feb. 2010 and entitled "Method and Device for Processing Paging Message in Idle State Signalling Reduction-Activated State". The entire contents of the foregoing applications are hereby incorporated herein by reference.

FIELD OF THE INVENTION

The present invention relates to the field of radio communications and particularly to a method and device for processing a paging message in an idle state signalling reduction-activated state.

BACKGROUND OF THE INVENTION

1. Brief Introduction of ISR (Idle State Signalling Reduction) Function

ISR is a technology of reducing idle state signalling. After a UE (User Equipment) is registered with both an MME (Mobility Management Entity) and a SGSN (Serving GPRS Support Node, where GPRS stands for General Packet Radio Service) and ISR is activated, the UE in an idle state moves between a list of registered TAIs (Tracking Area Identities) of an E-UTRAN (Evolution-Universal Terrestrial Radio Access Network) covered by the MME and a registered RA (Routing Area) of a UTRAN (Universal Terrestrial Radio Access Network) covered by the SGSN without any signalling interaction with the network. ISR is activated under the control of the network, the MME/SGSN sets whether to activate ISR in a TAU/RAU Accept (TAU stands for Tracking Area Update, and RAU stands for Routing Area Update) message, and the UE activates or deactivates ISR in response to the indicator.

2. Brief Introduction of CSFB (Circuit Switched Fallback or Simply CSFB or CS Fallback) Function CSFB supports characteristics of a CS (Circuit Switch) service of an LTE (Long Term Evolution) user equipment over a traditional 2G/3G network. The CS service characteristics include a CS call, an SMS (Short Messaging Service), an MT-LCS (Mobile Terminating Location Services), an MO-LCS (Mobile Originating Location services), etc.

The LTE UE is attached to EPS (Evolved Packet System) services and non-EPS services via a Combined EPS/IMSI Attach process in an LTE system. Upon successful attachment, a SGs interface is set up between a Mobility Management Entity (MME) of the EPS services and a mobility management entity MSC/VLR (Mobile Switching Center/Visited Location Register) of the non-EPS services, and the UE resides in an E-UTRAN. When there is a CS call coming to the MSC/VLR, if the UE is in an idle state, the MSC/VLR pages the UE through the MME, and upon reception of paging, the UE firstly performs an SR (Service Request) process and then falls back to a 2G/3G system to answer the call.

The terms "MSC/VLR" and "VLR" in the invention can be used interchangeably and have the same meaning.

3. Brief Introduction of SMSonly (Short Messaging Service-Only Characteristic)

SMSonly refers to the characteristic of SMSonly introduced in a 3GPP LTE network because a network operator requires that no CSFB be deployed but an SMS be supported in its network in view of a demand for directing an LTE UE in need of CS voice (voice centric) to have an access over a traditional 2G/3G network while having a UE in need of data (data centric) reside in an LTE network and offering an SMS over the LTE network.

A UE in need of SMSonly is attached to EPS services and non-EPS services via a Combined EPS/IMSI Attach process in an LTE system. In this Combined EPS/IMSI Attach process, the UE shall transmit an indicator of SMSonly to the network to indicate its need of the EPS services and an SMS for use. If SMSonly is supported over the network, the support of SMSonly over the network is indicated in an Attach Accept message. Upon successful attachment, a SGs interface is set up between a Mobility Management Entity (MME) of the EPS services and a mobility management entity MSC/VLR of the non-EPS services, and the UE resides in an E-UTRAN. When there is an MT-SMS (Mobile Terminating-SMS) coming to the MSC/VLR, if the UE is in an idle state, the MSC/VLR pages the UE through the MME, and upon reception of paging, the UE firstly sets up a signalling connection with the network and then can receive the MT-SMS from the MSC/VLR via an NAS (Non Access Stratum) signalling message. In this case, the UE will not fell back to a 2G/3G network.

Reference can be made to 3GPP 23.272 for a description of CSFB and SMSoverSGs ("SMS over SGs interface"). Reference can also be made to 3GPP 23.272 (updated with the document S2-097374) for a relationship between CSFB and/or SMSonly and ISR. In this application document SMSonly and SMSoverSGs have the same meaning and can be used interchangeably.

A drawback of the prior art lies in the following problem.

If a VLR setting up a SGs interface with an MME is a default VLR, there is a possible absence of a signalling connection between the VLR and a radio access network node of a current GERAN/UTRAN of a UE, so that even if the UE responded to paging, the response message might have been discarded by the network, thus resulting in wasted network resources occurring at an MME-SGSN interface, at a GERAN/UTRAN air interface and at an MSC/VLR. Also an unnecessary process may be incurred at the UE.

SUMMARY OF THE INVENTION

A technical problem to be addressed by the invention is to provide a method and device for processing a paging message in an idle state signalling reduction-activated state.

An embodiment of the invention provides a method for processing a paging message in an ISR-activated state, which includes the steps of:

receiving, by an MME, a paging message from an MSC/VLR; and transmitting, by the MME, no paging message to an SGSN upon determining that the MSC/VLR is a default MSC/VLR and the paging message is intended for an SMS.

An embodiment of the invention provides a method for processing a paging message in an ISR-activated state, which includes the steps of:

receiving, by an SGSN, a CS Paging Indication message from an MME and then determining whether the message is triggered by a paging message from a default MSC/VLR; and discarding, by the SGSN, the CS Paging Indication message without paging a UE in a UTRAN/GERAN upon determining that the CS Paging Indication message is triggered by a paging message from a default MSC/VLR.

An embodiment of the invention provides an MME device, including:

a receiving module configured to receive a paging message from an MSC/VLR; and a judging module configured to transmit no paging message to an SGSN upon determining that the MSC/VLR is a default MSC/VLR and the paging message is intended for an SMS.

An embodiment of the invention provides a SGSN device including:

a determining module configured to receive a CS Paging Indication message from an MME and then determine whether the message is triggered by a paging message from a default MSC/VLR; and a judging module configured to discard the CS Paging indication message without paging a UE in a UTRAN/GERAN when the SGSN determines that the CS Paging Indication message is triggered by a paging message from a default MSC/VLR.

Advantageous effects of the invention are as follows.

In one technical solution according to the invention, an MME will not transmit a paging message to an SGSN upon determining that an MSC/VLR is a default MSC/VLR and the paging message is intended for an SMS.

In another technical solution according to the invention, upon reception of a CS Paging Indication message from an MME, an SGSN discards the CS Paging Indication message and will not page a UE in a UTRAN/GERAN upon determining that the CS Paging Indication message is triggered by a SGsAP-Paging-Request message from a virtual VLR.

As can be apparent from the foregoing solutions, the solutions can reduce unnecessary paging signalling in an EPS system and a 2G/3G system to thereby avoid wasted network resources occurring at an MME-SGSN interface, at a GERAN/UTRAN air interface and at an MSC/VLR.

DETAILED DESCRIPTION OF THE EMBODIMENTS

The inventors have identified during making of the invention the following issues.

To perform the SMSonly function, after a UE is attached successfully in a Combined EPS/IMSI Attach process, a SGs interface is set up between a Mobility Management Entity (MME) of EPS services and a mobility management entity MSC/VLR of non-EPS services, and the UE resides in an E-UTRAN. When there is an MT-SMS coming to the MSC/VLR, if the UE is in an idle state, the MSC/VLR pages the UE through the MME, and upon reception of paging, the UE firstly sets up a signalling connection with the network and then can receive the MT-SMS from the MSC/VLR via an NAS signalling message. It shall be noted that the UE will not fall back to a 2G/3G network in this case.

As can be apparent:

1. The UE will not fall back to a GERAN/UTRAN in MT-SMS and MO-SMS scenarios; and 2. The E-UTRAN may not overlap with the GERAN/UTRAN in terms of coverage. This applies only to the UE for which only an SMS but no other CSFB service is used.

Reasons of such a design lie in that:

1. The number of configured correspondence relationships between TAs (Tracking Areas) and LAs (Location Areas) can be reduced at the MME and even no correspondence relationship between a TA and an LA is configured at the MME; and 2. The number of MSCs/VLRs updated over the network for supporting SMSoverSGs is greatly reduced, and it is only necessary to deploy a few (at least one) MSCs/VLRs supporting the SMSoverSGs function, which are referred to as a "virtual MSC/VLR" or "default MSC/VLR" in the invention.

That is, when the UE performs SMSonly-type Attach, the MME concludes an MSC/VLR which may be a virtual MSC/VLR covering a UTRAN and a GERAN, both of which may not overlap with an E-UTRAN location area where the UE is currently located. This is defined in this application as a scenario A (case A), and in this scenario, the UTRAN and the GERAN covered by the MSC/VLR do not overlap with the E-UTRAN location area where the UE is currently located. This scenario has an advantage of eliminating both the need to update all the MSCs/VLRs over the network to support a SGs interface and the need to configure on the MME a correspondence relationship between a TA and an LA. Such network deployment has a low operation cost.

Figure 1:
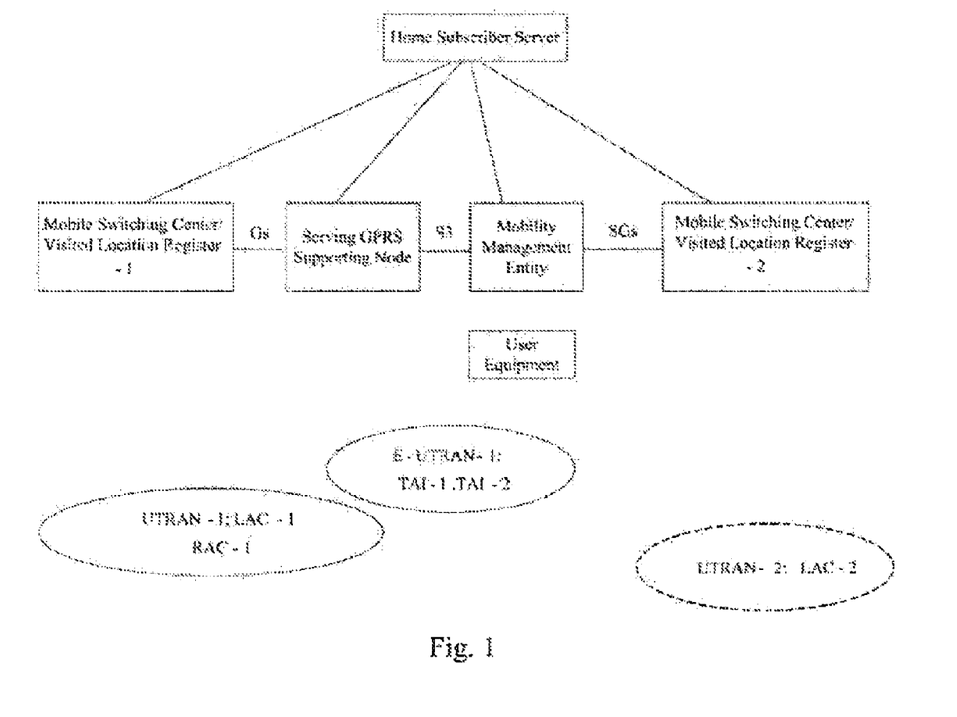
FIG. 1 is a schematic diagram of a positional relationship in an SMSonly scenario according to an embodiment of the invention.

FIG. 1 is a schematic diagram of a positional relationship in the SMSonly scenario, and as illustrated, there is coverage of two UTRANs, i.e., UTRAN-1 and UTRAN-2 respectively, where a location area code and a mating area code of the UTRAN-1 are LAC-1 and RAC-1, and a location area code of the UTRAN-2 is LAC-2; and there is also coverage Of one EUTRAN, and identities of two covered location areas are TAI-1 and TAI-2 respectively. When the UE is attached to EPS services and SMSonly in the EUTRAN, an MME chooses to Set up a SGs interface with an MSC/VLR-2, and the network indicates to it an LAC which is the LAC-2, while the actual UTRAN coverage is the LAC-5.

Then when the UE moves into/out of the EUTRAN area, an inter-MSC location update shall be performed to ensure that a short message service is available to the UE, and reference can be made to the 3GPP 23.272 for details thereof.

A Combined EPS/IMSI TA/LA process initiated by a UE for implementing CSFB and/or SMSonly will be described below. This process applies to a scenario in which the UE moves from a UTRAN into an E-UTRAN.

In this process, if the UE has no GUTI (Globally Unique Temporary Identity) but only a P-TMSI (Packet Temporary Mobile Station identity during a TAU, an MME will conclude an LAI (Location Area ID) according to the P-TMSI and select an MSC/VLR according to the LAI to perform a location update process. If an operator supports only SMSonly but no CSFB, it is only necessary to update a small number of MSCs/VLRs (corresponding special LAI values are configured at the MME) to support a SGs interface. In this case, the MME will just select a special LAI value and set up a SGs interface to an MSC/VLR corresponding to the LAI. If a GUTI of the UE is not obtained through mapping, the MME can alternatively select a special LAI according to a local configuration. The special LAI value is a default LAI value.

If the MME selects a default LAI, radio coverage of a VLR to which the LAI points may not overlap with a location where the UE is currently located. Furthermore, if the VLR is only intended to enable the SMSonly characteristic with the MME, the VLR may not necessarily be connected to any access network of UTRAN/GERAN or like.

With ISR activated and the SGs interface between the MSC/VLR and the MME, when there is an MT-SMS message coming to the MME, following the existing specification (see 8.2.5.f, Mobile Terminating SMS when ISR is active and SGs is active between MSC/VLR and MME), the MME shall page the UE in the E-UTRAN and transmit a paging message to an SGSN, the SGSN will page the UE in the GERAN/UTRAN, and the UE will respond to the MSC upon reception of paging in the GERAN/UTRAN.

Thus the following problem may arise in 8.2.5.f.

If the VLR setting up the SGs interface with the MME is a virtual VLR, there is a possible absence of a signalling connection between the VLR and a radio access network node of the current GERAN/UTRAN of the UE, so that even if the UE responded to paging, the response message might have been discarded by the network, thus resulting in wasted network resources occurring at an MME-SGSN interface, at a GERAN/UTRAN air interface and at an MSC/VLR.

In view of the foregoing problem, a technical solution according to the invention will reduce a number of MT-SMS related paging messages in a scenario with the SMSonly characteristic and ISR activated. Implementations will be described below with reference to the drawings.

Figure 2:
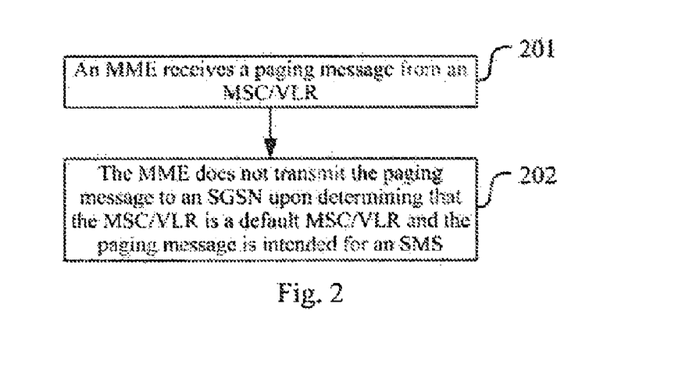
FIG. 2 is a schematic flow chart of performing a first method for processing a paging message of a UE in an ISR-activated state according to an embodiment of the invention.

FIG. 2 is a schematic flow chart of performing a first method for processing a paging message of a UE in an ISR-activated state, where the process is performed primarily on an MME, and then as illustrated, a paging message can be processed in the following steps.

Step 201. An MME receives a paging message from an MSC/VLR.

Step 202. The MME does not transmit the paging message to an SGSN upon determining that the MSC/VLR is a default MSC/VLR and the paging message is intended for an SMS.

In an implementation, the MME will not transmit a paging message to an SGSN when it receives the paging message from a default MSC/VLR and the message is intended for an SMS.

An SGSN will not transmit a paging message in a UTRAN/GERAN upon reception of OS-Paging via an S3 interface; that is, in an implementation, the SGSN will not transmit such a message upon reception thereof. Of course, in a specific implementation, the MME may not transmit the paging message and then the SGSN will not receive the paging message; or the MME can transmit the paging message and the SGSN can filter it also for the purpose of reducing unnecessary paging signalling.

In a specific implementation, in the existing specification TS23.272, when an MT-Call and ISR coexist, the section 7.7.2, "Mobile Terminating Call when ISR is active and SGs is active between MSC/VLR and MME" describes a requirement on forwarding a paging message from an MME to an SGSN, and the contents of the paging message transmitted from the MSC/VLR to the MME are as follows (see TS29.118).

TABLE 8.14.1.1

SGsAP-PAGING-REQUEST message content

| Information element | Type/Reference | Presence | Format | Length |
|---|---|---|---|---|
| Message type | Message type 9.2 | M | V | 1 |
| IMSI | IMSI 9.4.6 | M | TLV | 6-10 |
| VLR name | VLR name 9.4.22 | M | TLV | 3-n |
| Service indicator | Service indicator 9.4.17 | M | TLV | 3 |
| TMSI | TMSI 9.4.20 | O | TLV | 6 |
| CLI | CLI 9.4.1 | O | TLV | 3-14 |
| Location area identifier | Location area identifier 9.4.11 | O | TLV | 7 |
| Global CN-Id | Global CN-Id 9.4.4 | O | TLV | 7 |
| SS code | SS code 9.4.19 | O | TLV | 3 |
| LCS indicator | LCS indicator 9.4.10 | O | TLV | 3 |
| LCS client identity | LCS client identity 9.4.9 | O | TLV | 3-n |
| Channel needed | Channel needed 9.4.23 | O | TLV | 3 |
| eMLPP Priority | eMLPP Priority 9.4.24 | O | TLV | 3 |

In the foregoing message, the Service Indicator indicates the following contents:
Service indicator
Bits
8 7 6 5 4 3 2 1
where 0 0 0 0 0 0 0 0 shall not be sent in this version of the protocol. If received, shall be treated as '0 0 0 0 0 0 0 1'
0 0 0 0 0 0 0 1 CS call indicator
0 0 0 0 0 0 1 0 SMS indicator
0 0 0 0 0 0 1 1
to
1 1 1 1 1 1 1 1 shall not be sent in this version of the protocol. If received, shall be treated as '00000001'.

When the Service indicator lakes the value of "0 0 0 0 0 0 1 0", it indicates that the paging message is intended for paging of an MT-SMS.

The VLR name is the name of an VLR transmitting the paging message and in the format of a Fully Qualified Domain Name (FQDN). The MME can conclude a VLR number of the VLR according to the VLR name.

That is, with ISR activated, the MME judges whether the SGsAP-Paging-Request message comes from a default VLR, and if it comes from a default VLR, the MME will not forward the CIS-Paging message to the corresponding SGSN.

In an implementation, the MME can determine an MSC/VLR as a delimit MSC/VLR in one of the following approaches.

1. A VLR number of a VLR transmitting the SGsAP-Paging-Request message is obtained from the paging message, the VLR number is compared with locally configured VLR numbers of VLRs for the SMSonly characteristic, and if the VLR number is one of the VLR numbers of the VLRs specially for the SMSonly characteristic, the VLR is determined as a default VLR.

In an implementation, the SGsAP-Paging-Request message can be parsed to obtain a VLR number of a VLR transmitting the message, the VLR number is compared with locally configured VLR numbers of VLRs for the SMSonly characteristic, and if the VLR number is one of the VLR numbers of the VLRs specially for the SMSonly characteristic, this indicates that the VLR is a default VLR.

2. The MME configures locally FQDNs of default VLRs, and if the VLR name obtained from the SGsAP-Paging-Request message belongs to the locally configured FQDNs of the default VLRs, the VLR is determined as a default VLR.

In an implementation, the MME can configure locally FQDNs of default VLRs and can determine whether the VLR name in the SGsAP-Paging-Request message is for a default VLR by comparing the VLR name in the message with the local configuration.

3. When the MME sets up a SGs interface to a default VLR, the MME recodes the VLR to which the interface is connected as a default VLR, and if the SGsAP-Paging-Request message is received via the interface, the MME determines that the paging message comes from a default VLR.

In an implementation, when the MME sets up a SGs interface to a default VLR, a flag bit is set to record that the VLR is a default VLR, and thus when the SGsAP-Paging-Request message from the VLR is received via the interface, it can be determined that the message comes from a default VLR.

4. When no correspondence relationship between a TA and an LA is configured in the MME, a VLR setting up a SGs interface with the MME is determined as a default VLR.

That is, if no correspondence relationship between a TA and an LA is configured in the MME, a VLR setting up a SGs interface with the MME is a default VLR.

In an implementation, it can be judged whether a correspondence relationship between a TA and an LA is configured at the MME when the MME sets up a SGs interface to a VLR, and if not, the VLR is determined as a default VLR, and a flag bit is set to record that the VLR is a default VLR; and thus when the SGsAP-Paging-Request message from the VLR is received, it can be determined that the message comes from a default VLR.

Alternatively, it can be judged whether a correspondence relationship between a TA and an LA is configured at the MME when the MME receives the SGsAP-Paging-Request message via a SGs interface, and if not, it is determined that the message comes from a default VLR.

When the MSC/VLR is determined as a default MSC/VLR in the foregoing approaches, the MME will not forward the CS-Paging message to the SGSN. That is, the UE is in an idle state, and for this UE, the MME and a specific SGSN activate ISR, but since the received SGsAP-Paging-Request message comes from a default VLR, the MME will not forward the CS Paging message to the SGSN. Thus whether to forward the CS Paging message to the SGSN can be determined by judging whether the paging message comes from a default VLR.

In an implementation, the MME can further determine whether the paging message is intended for an SMS as follows:

it is determined according to the Service indicator in the SGsAP-Paging-Request message whether the paging message is a paging message intended for an SMS.

In a specific implementation, a further judgment condition can be added, and it is judged from the Service indicator whether the paging message is a paging message intended for an SMS, that is, it is judged whether the Service indicator takes the value of "0 0 0 0 0 0 1 0", and if so, the CS-Paging message will not be forwarded; otherwise, the received SGsAP-Paging-Request message is processed as an error message because a default VLR typically processes only an SMS-related service.

When the MME does not perform the judgment, the SGSN can also judge whether to transmit the CS-Paging message as described below.

Figure 3:
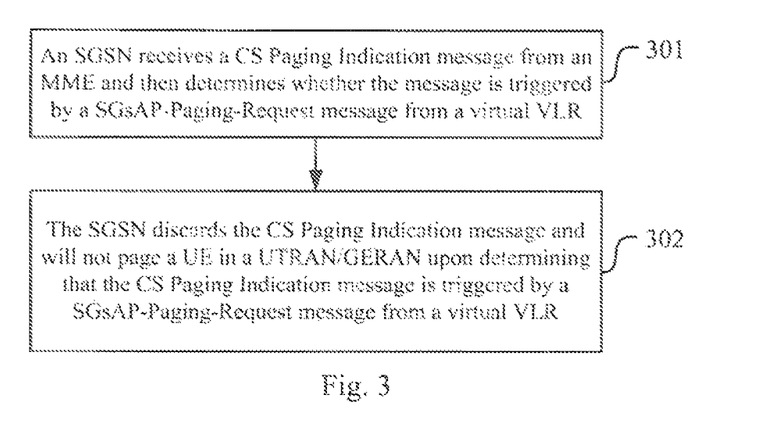
FIG. 3 is a schematic flow chart of performing a second method for processing a paging message of a UE in an ISR-activated state according to an embodiment of the invention.

FIG. 3 is a schematic flow chart of performing a second method for processing a paging message in an ISR-activated state, where the process is performed primarily on art SGSN, and then as illustrated, a paging message can be processed in the following steps.

Step 301. An SGSN receives a CS Paging Indication message from an MME and then determines whether the message is triggered by a SGsAP-Paging-Request message from a virtual VLR.

Step 302. The SGSN discards the CS Paging Indication message and will not page a UE in a UTRAN/GERAN upon determining that the CS Paging Indication message is triggered by a SGsAP-Paging-Request message from a virtual VLR.

An interface between the MME and the SGSN is an S3 interface, and reference can be made to the definition of 29.274 for the contents of the paging message transmitted from the MME to the SGSN particularly as follows:

TABLE 7.4.5-1

| Information Element in CS Paging Indication | | | | |
|---|---|---|---|---|
| Information elements | P | Condition/Comment | IE Type | Ins. |
| IMSI | M | | IMSI | 0 |
| VLR Name | M | | FQDN | 0 |
| TMSI | O | | TMSI | 0 |
| Location area identifier | O | | ULI | 0 |
| Global CN-Id | O | | Global CN-Id | 0 |
| Channel needed | O | | Channel needed | 0 |
| eMLPP Priority | O | | eMLPP Priority | 0 |
| Private Extension | O | | Private Extension | VS |

A key of the solution lies in how the SGSN judges that the received CS Paging Indication message from the MME is triggered by a SGsAP-Paging-Request message, received by the MME, transmitted from a virtual VLR, and in a specific implementation, this can be judged in one of the following approaches.

1. The SGSN determines that the CS Paging Indication message is triggered by a SGsAP-Paging-Request message from a virtual VLR upon determining according to an indicator of the MME in the CS Paging Indication message that the VLR is a default VLR.

In an implementation, the MME can indicate in the CS Paging Indication message that the VLR is a default VLR; and particularly this can be indicated by an IE (Information Element) added in the message or can be indicated by another existing IE therein.

2. The SGSN configures locally default VLRs, and if the VLR obtained from the CS Paging Indication message belongs to the locally configured default VLRs, the VLR is determined as a default VLR.

In an implementation, the judgment can be made against an existing parameter in the CS Paging Indication message. Following the existing specification, no VLR is configured in the SGSN as a default VLR. Thus in an implementation, information of default VLRs can be configured in the SGSN, so when the CS Paging Indication message is received, the VLR in the message is compared with the locally configured default VLRs to thereby determine whether it comes from a default VLR.

3. If the Location area identifier IE in the message contains location information allocated for the UE by the VLR and a location to which the location information points is not in a location area covered ("covered" is also referred to as "served") by the SGSN, it is determined that the CS Paging Indication message is triggered by a SGsAP-Paging-Request message from a virtual VLR.

In an implementation, the judgment can be made against an existing parameter in the CS Paging Indication message. If the Location area identifier IE in the message contains location information allocated for the UE by the VLR and a location to which the location information points is not in a location area covered by the SGSN, since location information allocated by a virtual VLR is typically different from a location area managed by an SGSN, it can hereby be judged that the CS Paging Indication message is triggered by a paging message from a virtual VLR.

In the foregoing approaches, the SGSN can discard the CS Paging Indication message and will not page the UE in a UTRAN/GERAN upon determining that the CS Paging Indication message is triggered by a SGsAP-Paging-Request message from a virtual VLR.

Based upon the same inventive concept, embodiments of the invention further provide an MME device and an SGSN device, and since these devices address the problem under a similar principle to the first method for processing a paging message of a UE in an ISR-activated state and the second method for processing a paging message of a UE in an ISR-activated state, reference can be made to the implementations of the methods for implementations of these devices, and a repeated description thereof will be omitted here.

Figure 4:
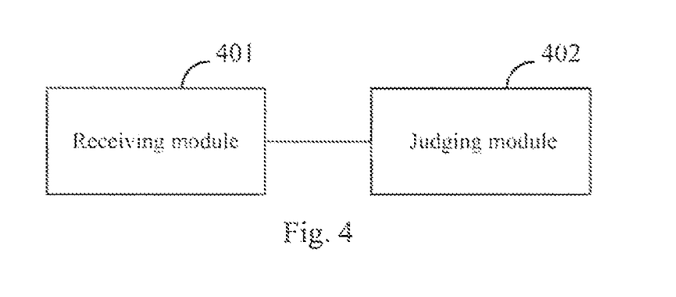
FIG. 4 is a schematic structural diagram of an MME device according to an embodiment of the invention.

FIG. 4 is a schematic structural diagram of an MME device, and as illustrated, the MME can include:

a receiving module 401 configured to receive a paging message from an MSC/VLR; and a judging module 402 configured to transmit no paging message to an SGSN upon determining that the MSC/VLR is a default MSC/VLR and the paging message is intended for as SMS.

In an implementation, the judging module can include one or a combination of a first judging unit, a second judging unit, a third judging unit and a fourth judging unit, where:

the first judging unit is configured to obtain from a SGsAP-Paging-Request message a VLR number of a VLR transmitting the paging message, compare the VLR number with locally configured VLR numbers of VLRs for the SMSonly Characteristic, and if the VLR number is one of the VLR numbers of the VLRs specially for the SMSonly characteristic, to determine the VLR as a default VLR;

the second judging unit is configured to configure locally FQDNs of default VLRs at the MME, and if a VLR name obtained from a SGsAP-Paging-Request message belongs to the locally configured FQDNs of the default VLRs, to determine the VLR as a default VLR;

the third judging unit is configured, when the MME sets up a SGs interface to a default VLR, to recode the VLR to which the interface is connected as a default VLR, and if a SGsAP-Paging-Request message is received via the interface, to determine that the paging message comes from a default VLR; and the fourth judging unit is configured, when no correspondence relationship between a TA and an LA is configured in the MME, to determine a VLR setting up a SGs interface with the MME as a default VLR.

In an implementation, the judging module can be further configured to judge from a Service indicator in the SGsAP-Paging-Request message whether the paging message is a paging message for an SMS when the MME determines that the paging message is intended for the SMS.

Figure 5:
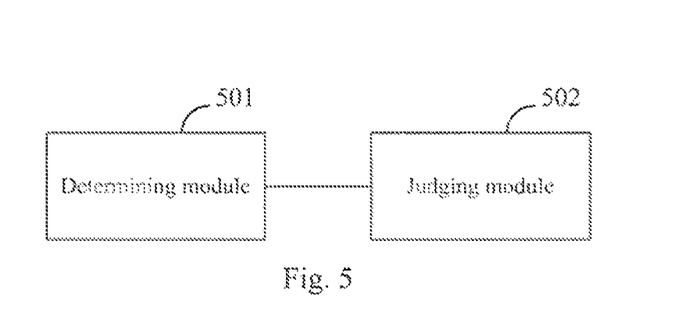
FIG. 5 is a schematic structural diagram of a SGSN device according to an embodiment of the invention.

FIG. 5 is a schematic structural diagram of an SGSN device, and as illustrated, the SGSN can include:

a determining module 501 configured to receive a CS Paging Indication message from an MME and then determine whether the message is triggered by a SGsAP-Paging-Request message from a virtual VLR; and a judging module 502 configured to discard the CS Paging Indication message without paging a UE in a UTRAN/GERAN when the SGSN determines that the CS Paging Indication message is triggered by a SGsAP-Paging-Request message from a virtual VLR.

In an implementation, the judging module can include one or a combination of a first judging unit, a second judging unit and a third judging unit, where:

the first judging unit is configured to determine that the CS Paging Indication message is triggered by a SGsAP-Paging-Request message from a virtual VLR upon determining, from an indicator of the MME in the CS Paging indication message, a VLR as a default VLR;

the second judging unit is configured to determine a VLR obtained from the CS Paging indication message as a default VLR if the VLR belongs to default VLRs locally configured at the SGSN; and the third judging unit is configured to determine that the CS Paging Indication message is triggered by a SGsAP-Paging-Request message from a virtual VLR if a Location area identifier IE in the message includes location information allocated for the UE by a VLR and a location indicated in the location information is not in a location area covered by the SGSN.

For the convenience of a description, the respective components of the foregoing devices have been described respectively by functionally dividing them into respective modules or units. Of course, the functions of the respective modules or units can be performed in the same one or a plurality of items of software or hardware to put the invention into practice.

As can be apparent from the foregoing embodiments:

In one solution, after an MME activates ISR with a specific SGSN for a UE, upon reception of a SGsAP-Paging-Request message via a SGs interface, the MME judges whether the message comes from a default VLR, and if so, the MME will not forward the message to the corresponding SGSN; and In the other solution, upon reception of a CS Paging indication message from an MME, an SGSN judges whether the message comes from a virtual VLR:

the SGSN discards the CS Paging Indication message and will not page the UK in a UTRAN/GERAN upon determining that the CS Paging Indication message is triggered by a SGsAP-Paging-Request message from a virtual VLR.

With both of the solutions, unnecessary paging signalling in an ESP system and a 2G/3G system can be reduced.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore, the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions, can also be stored into a computer readable memory capable of directing the computer or the other programmable data processing device to operate in a specific manner so that me instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable data processing device provide steps for performing the functions specified in the flow(s) of the flow chart and/or the block(s) of the block diagram.

Although the preferred embodiments of the invention have been described, those skilled in the art benefiting from the underlying inventive concept can snake additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the scope of the invention. Thus the invention is also intended to encompass these modifications and variations thereto so long as the modifications and variations come into the scope of the claims appended to the invention and their equivalents.

The invention claimed is:

1. A method for processing a paging message in an Idle State Signalling Reduction, ISR, activated state, comprising:
  receiving, by a Mobility Management Entity (MME) a paging message from a Mobile Switching Center (MSC)/Visited Location Register (VLR), the paging message from the MSC/VLR in a format of a SGs interface paging request (SGsAP-Paging-Request) message
  transmitting, by the MME, no paging message to a Serving GPRS Support Node (SGSN) upon determining that the MSC/VLR is a default MSC/VLR and the paging message is intended for a Short Messaging Service (SMS); and
  determining by the MME the MSC-VLR as a default MSC/VLR, comprising:
    obtaining from the SGs interface paging request (SGsAP-Paging-Request) message a VLR number of a VLR transmitting the paging message, comparing the VLR number with locally configured VLR numbers of default VLRs, and if the VLR number is one of the locally configured VLR numbers of the default VLRs, determining the VLR transmitting the paging message as a default VLR;
    configuring locally, by the MME, Fully Qualified Domain Names (FQDNs) of default VLRs, and if a VLR name obtained from the SGsAP-Paging-Request message belongs to the locally configured FQDNs of the default VLRs, determining the VLR as a default VLR;
    when the MME sets up a SGs interface to a default VLR, recoding the VLR to which the interface is connected as a default VLR, and if the SGsAP-Paging-Request message is received via the interface, determining that the paging message comes from a default VLR; or
    determining a VLR setting up a SGs interface with the MME as a default VLR when no correspondence relationship between a Tracking Area (TA) and a Location Area (LA) is configured in the MME.

2. The method according to claim 1, wherein the default MSC/VLR is an MSC/VLR configured to support the Short Messaging Service-Only, SMSonly, (SMSonly) characteristic.

3. The method according to claim 1, wherein determining by the MME that the paging message is intended for the SMS comprises:
  determining from a Service indicator in the paging message in the format of a SGsAP-Paging-Request message whether the paging message is a paging message intended for the SMS.

4. A method for processing a paging message in an ISR-activated state, comprising:
  receiving, by an SGSN, a Circuit Switched (CS) Paging Indication message from an MME and then determining whether the message is triggered by a paging message from a default MSC/VLR; and
  discarding, by the SGSN, the CS Paging Indication message without paging a UE in a UTRAN/GERAN upon determining that the CS Paging Indication message is triggered by a paging message from a default MSC/VLR,
  wherein determining by the SGSN that the CS Paging Indication message is triggered by a paging message from a default MSC/VLR comprises:
    determining, by the SGSN, that the CS Paging Indication message is triggered by a paging message from a default VLR upon determining from an indicator of the MME in the CS Paging Indication message that a VLR is a default VLR;
    configuring locally, by the SGSN, default VLRs and if a VLR obtained from the CS Paging Indication message belongs to the locally configured default VLRs, determining the VLR as a default VLR; or
    if a Location area identifier IE in the message contains location information allocated for the UE by a VLR and a location to which the location information points is not in a location area covered by the SGSN, determining that the CS Paging Indication message is triggered by a paging message from a default VLR.

5. The method according to claim 4, wherein the default MSC/VLR is an MSC/VLR configured to support Short Messaging Service-Only (SMSonly) characteristic, and the paging message from the default MSC/VLR is in a format of a SGs interface paging request, SGsAP-Paging-Request, message.

6. An MME device, comprising:
  one or more processors implementing a receiving module and a judging module;

the receiving module receiving a paging message from an MSC/VLR; and the judging module transmitting no paging message to an SGSN upon determining that the MSC/VLR is a default MSC/VLR and the paging message is intended for an SMS;

wherein the paging message from the MSC/VLR is in a format of a SGs interface paging request (SGsAP-Paging-Request) message, and the judging module comprises one or a combination of a first judging unit, a second judging unit, a third judging unit and a fourth judging unit, wherein the first judging unit obtains from the SGsAP-Paging-Request message a VLR number of a VLR transmitting the paging message, compares the VLR number with locally configured VLR numbers of default VLRs, and if the VLR number is one of the locally configured VLR numbers of the default VLRs, determines the VLR transmitting the paging message as a default VLR, the second judging unit configures locally FQDNs of default VLRs at the MME, and if a VLR name obtained from the SGsAP-Paging-Request message belongs to the locally configured FQDNs of the default VLRs, to determine the VLR as a default VLR, the third judging unit, when the MME sets up a SGs interface to a default VLR, recodes the VLR to which the interface is connected as a default VLR, and if the SGsAP-Paging-Request message is received via the interface, the third judging unit determines that the paging message comes from a default VLR, and the fourth judging unit, when no correspondence relationship between a TA and an LA is configured in the MME, determines a VLR setting up a SGs interface with the MME as a default VLR.

7. The device according to claim 6, wherein the judging module further determines from a Service indicator in the paging message in the format of a SGsAP-Paging-Request message whether the paging message is a paging message for an SMS when the MME determines that the paging message is intended for the SMS.

8. An SGSN device, comprising:

one or more processors implementing a determining module and a judging module;

the determining module receiving a CS Paging Indication message from an MME and then determining whether the message is triggered by a paging message from a default MSC/VLR; and the judging module discarding the CS Paging Indication message without paging a UE in a UTRAN/GERAN when the SGSN determines that the CS Paging Indication message is triggered by a paging message from a default MSC/VLR;

wherein the judging module comprises one or a combination of a first judging unit, a second judging unit and a third judging unit, wherein the first judging unit determines that the CS Paging Indication message is triggered by a paging message from a default VLR upon determining from an indicator of the MME in the CS Paging Indication message a VLR as a default VLR, the second judging unit determines a VLR obtained from the CS Paging Indication message as a default VLR if the VLR belongs to default VLRs locally configured at the SGSN, and the third judging unit determines that the CS Paging Indication message is triggered by a paging message from a default VLR if a Location area identifier IE in the message comprises location information allocated for the UE by a VLR and a location indicated in the location information is not in a location area covered by the SGSN.

\* \* \* \* \*